United States Patent [19]
Biblarz

[11] 3,777,564
[45] Dec. 11, 1973

[54] ELECTROGASDYNAMIC SPECTRAL ANEMOMETER
[75] Inventor: Oscar Biblarz, Monterey, Calif.
[73] Assignee: The United States of America as represented by the Secretary of the Navy, Washington, D.C.
[22] Filed: Dec. 27, 1971
[21] Appl. No.: 212,243

[52] U.S. Cl. ............................................. 73/194 F
[51] Int. Cl. ...................... G01f 1/00, G10n 27/62
[58] Field of Search ..................... 73/194 B, 194 F, 73/147, 181; 324/33; 310/5, 6, 7

[56] References Cited
UNITED STATES PATENTS
3,417,267  12/1968  Marks .................................... 310/6
3,184,967  5/1965   Rogers ................................ 73/194 F
3,359,796  12/1967  Dimick ............................... 73/194 F
3,638,054  1/1972   Honigsbaum ................... 73/194 F X OTHER PUBLICATIONS
Werner et al., "Investigation of a Corona Discharge for Measurements in Air Flow," 1952.

Primary Examiner—Charles A. Ruehl
Attorney—R. S. Sciascia et al.

[57] ABSTRACT

An electrogasdynamic spectral anemometer including a particle injector and a particle collector that are inserted into a turbulent fluid stream that is under investigation. The injector includes a hollow cylinder into which near saturated steam from an outside source is introduced. The injector also includes a nozzle, a corona needle and an attractor ring which are oppositely charged and located within the nozzle. As the steam passes through the nozzle it supersaturates and condenses into droplets having a size that is primarily determined by the condition of the incoming steam. The droplets are then charged through the corona developed between the corona needle and the attractor ring. Then the charged droplets are ejected from the nozzle and into the stream to be measured where they follow its rapid fluctuations. These charged particles move towards the collector which may be placed downstream of the injector. When a charged particle passes the collector it becomes neutralized and transmits an electrical signal into collector circuitry where it is analyzed to provide information about the intensity of the turbulence at various frequencies. Different droplet sizes are used for different turbulent frequencies of interest depending on the maximum value of the frequency present in the flow.

8 Claims, 9 Drawing Figures

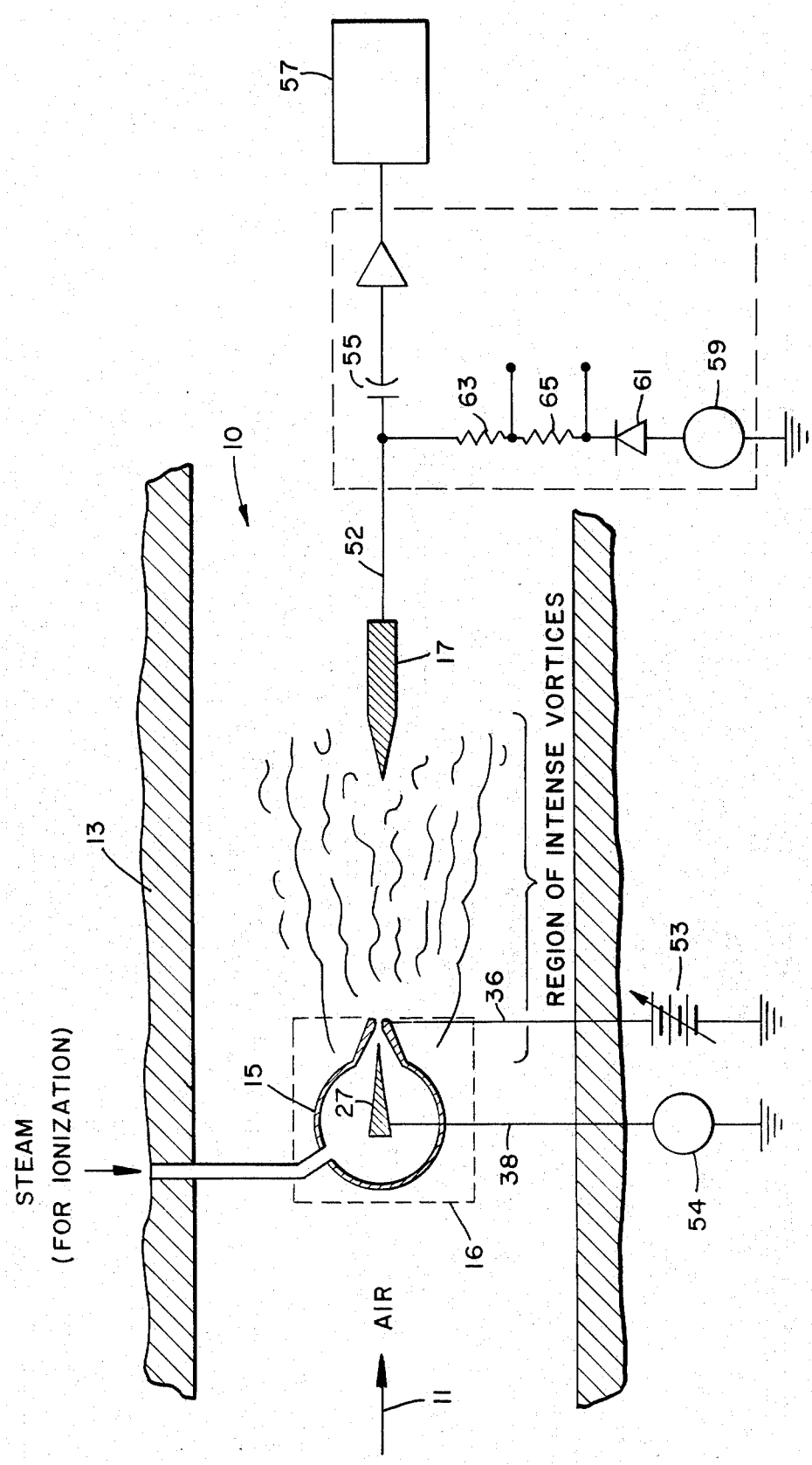
FIG_1

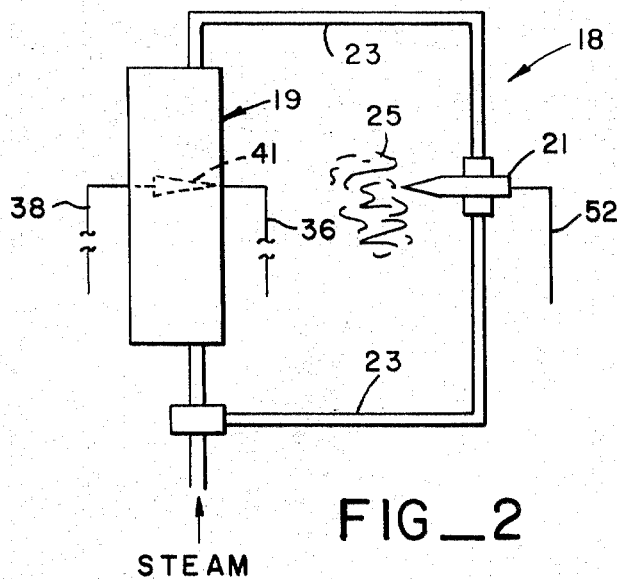
FIG_2
↑ STEAM
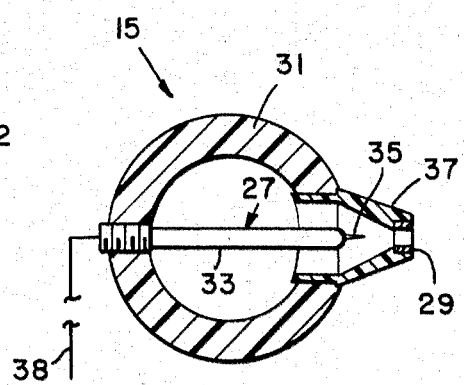
FIG_3
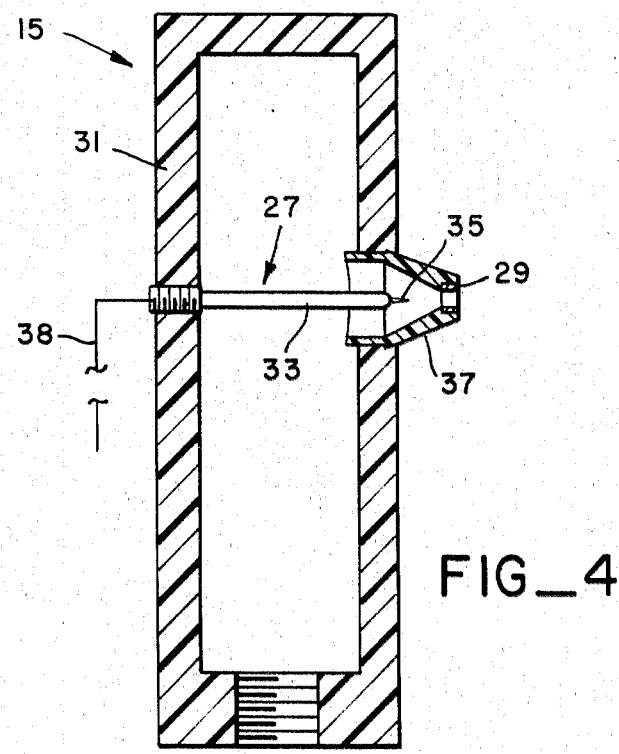
FIG_4
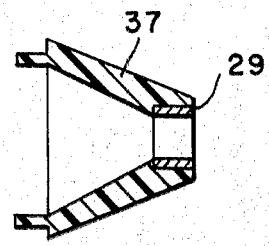
FIG_5
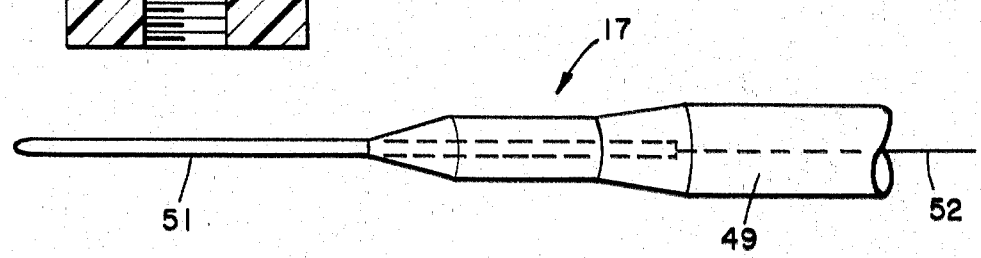
FIG_8

PATENTED DEC 11 1973 3,777,564
SHEET 3 OF 3
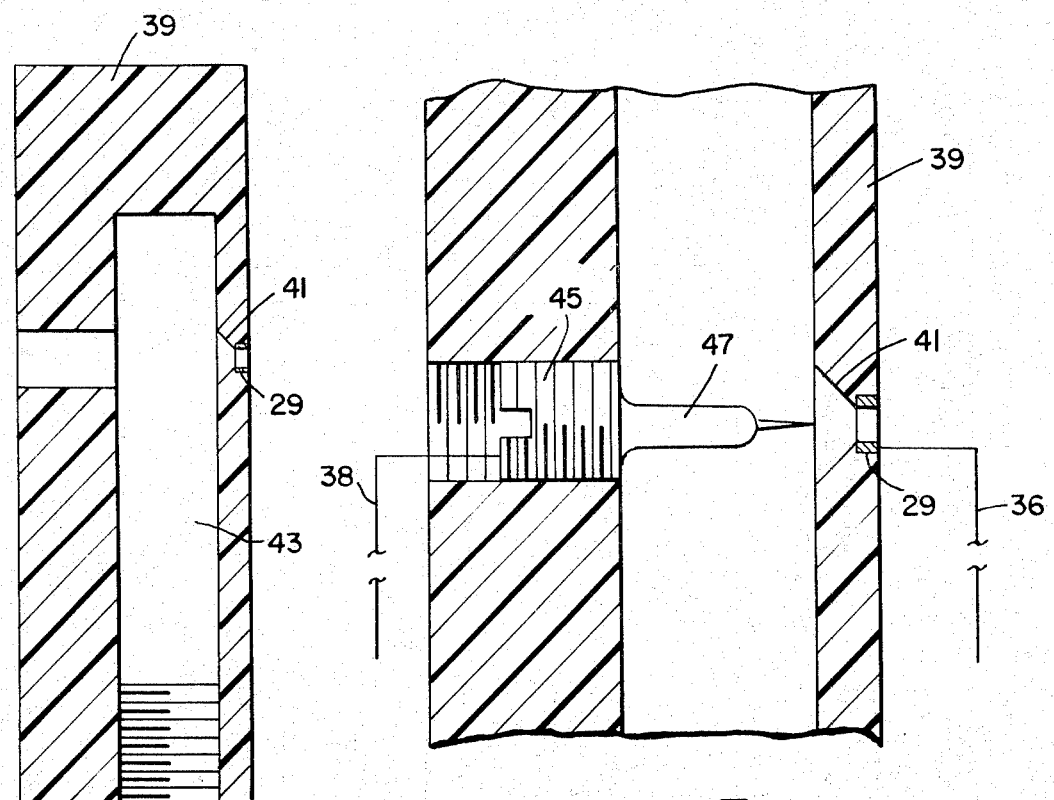
FIG_6
FIG_7
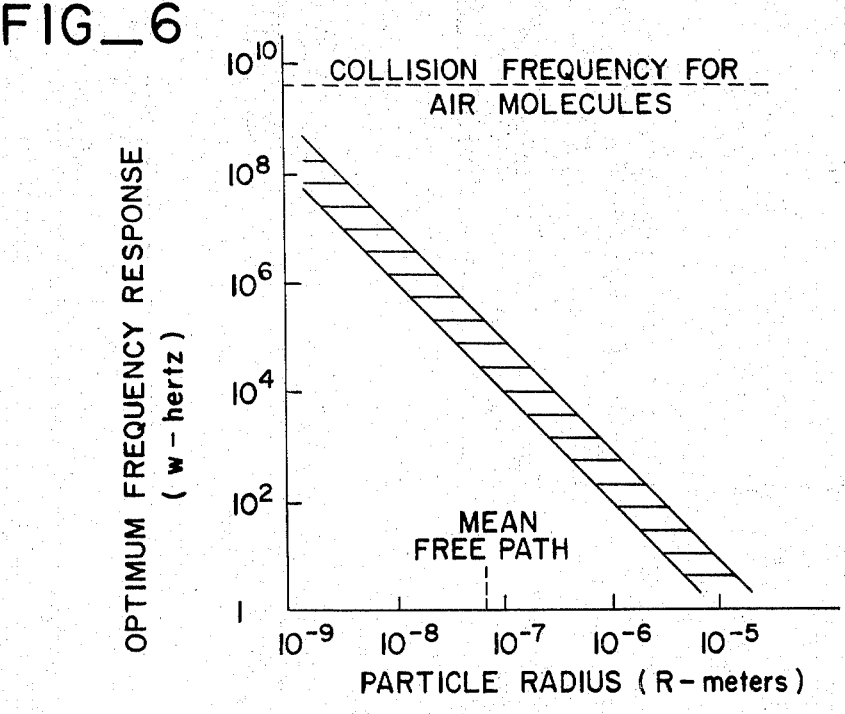
WATER DROPLETS IN AIR AT STANDARD CONDITION
FIG_9

3,777,564

ELECTROGASDYNAMIC SPECTRAL ANEMOMETER

BACKGROUND OF THE INVENTION

1. Field of the Invention

The present invention relates to an anemometer and more particularly to an electrogasdynamic spectral anemometer for use in measuring the spectral characteristics of unsteady flow covering a frequency spectrum up to about 50,000 hertz.

2. Description of Prior Art

Many different devices have been used in the past in attempts to accurately measure the spectral characteristics of unsteady flow conditions. A device frequently used for this purpose is generally referred to as a "hot-wire anemometer." This device consists of a very small temperature responsive wire that is inserted into an unsteady flow condition. Because of the unsteady flow condition the hot wire will convect heat at unsteady rate that corresponds to the unsteady flow. Unsteady current is applied to the hot wire to maintain the hot wire at a constant temperature. By measuring the unsteady current it is then possible to indirectly measure the unsteady flow condition. While this device is quite useful, it has the disadvantage of being quite fragile and breakage is frequently encountered. Moreover, it has serious limitations when used for mesuring high frequency unsteady flow conditions. This is primarily because, to be responsive to high frequency unsteady flow (for example in the 50,000 hertz range), it is necessary to make the wire exceedingly small and therefore very fragile and difficult to calibrate. Moreover, it is an indirect measurement requiring calibration for each flow medium.

The present invention overcomes these disadvantages by providing an electrogasdynamic anemometer that does not employ a hot wire, but rather, employs a charged particle injector and a charged particle collector to measure the passage of the very small charged particles that are injected into the unsteady flow media.

SUMMARY OF THE INVENTION

Briefly, the electrogasdynamic spectral anemometer of the present invention generally comprises an injector and a collector that are inserted into the turbulent stream that is under investigation. In one embodiment the injector includes a hollow cylinder into which steam from an outside steam source is introduced and then ejected from a nozzle into the turbulent stream. The injector also includes a corona needle and an attractor ring which are positively charged and located within the nozzle. As the steam passes through the nozzle it supersaturates and condenses into discrete particles or droplets having varying size depending upon the condition of the incoming steam. The particles are then charged through the corona developed between the corona needle and the attractor ring. Then the charged particles are ejected from the nozzle and into the turbulent stream where they follow its rapid fluctuations. These charged particles move towards the needle collector which may be placed downstream of the injector. When a charged particle passes the needle of the collector it becomes neutralized and transmits a signal into collector circuitry where it is analyzed to provide information about the intensity of the turbulence at various frequencies. The intensity is determined by the total particle count over a predetermined sampling period at a selected frequency.

It has been found that the choice of particle size is very critical and is dependent upon the desired frequency response of the device. That is, if the turbulent flow has a maximum frequency of about 20,000 hertz, then the particle size must be about $10^{-7}$ meters. However, if the frequency is about 3,000 then the size of the particle can be about one micron. It has been found that dielectric liquids and certain solids may be used in place of water droplets.

STATEMENT OF THE OBJECTS OF THE INVENTION

The primary object of the present invention is to provide an anemometer that is effective for measuring turbulent flows.

Another object is to provide an anemometer that is accurate, rugged and reliable.

Other objects, advantages, and novel features of the present invention will become apparent from the following detailed description of the invention when considered in conjuction with the accompanying drawings.

BRIEF DESCRIPTION OF THE DRAWINGS

FIG. 1 is a schematic drawing of the electrogasdynamic spectral anemometer of the present invention;

FIG. 2 is a schematic drawing of an alternative embodiment of the anemometer of the present invention;

FIG. 3 is an end view, partly in section, of the injector of FIG. 1;

FIG. 4 is a side view, partly in section, of the injector of FIG. 1;

FIG. 5 is a sectional view of the nozzle of the injector of FIG. 1;

FIG. 6 is a side view of the injector of FIG. 2;

FIG. 7 is an enlarged side view of the injector of FIGS. 2 and 6;

FIG. 8 is a side view of the needle collector of the anemometers of FIGS. 1 and 2; and FIG. 9 is a graph illustrating the optimum water particle size versus frequency response.

DESCRIPTION OF THE PREFERRED EMBODIMENT

In FIG. 1 is illustrated a schematic drawing of the electrogasdynamic spectral anemometer 10 of the present invention. From a source, not shown, air flow 11 is introduced into test section 13. Included within test section 13 are injector cylinder 15 and needle collector 17 of the anemometer 10 of the present invention. The arrangement shown in FIG. 1 may be used to determine the turbulence generated by the configuration of the injector cylinder itself. It is to be understood that the injector cylinder could be made into many different configurations depending upon the particular shape desired for testing. Alternatively, a test fixture 16 having a different shape could be attached to and enclose the injector cylinder, as illustrated by dotted lines. If this were done then the turbulence measured by the needle collector 17 would be that of test fixture 16 and not the injector cylinder.

In FIG. 2 is illustrated another embodiment of the electrogasdynamic spectral anemometer 18 of the present invention. In this embodiment the injector cylinder 19 and needle collector 21 are held in rigid and fixed spaced relationship by means of insulator brackets 23.

It is to be understood that the FIG. 2 embodiment may be put into any fluid stream to measure its unsteady flow characteristics. For example, an air stream may flow perpendicular to the plane of the paper and the needle collector would measure the charged particles issuing from nozzle 41 thereby indicating the turbulence in the plane of the paper, as illustrated by lines 25.

Referring to FIGS. 1, 3, 4 and 5, injector cylinder 15 includes corona needle 27, attractor ring 29 and cylinder 31. The cylinder 31 is preferably made of Teflon, but it may be made of other dielectric materials. Corona needle 27 includes an enlarged metal section 33 which threads into cylinder 31 and includes a sharpened end 35 which is spaced from and centrally positioned with respect to attractor ring 29. Nozzle 37 may be formed integral with the cylinder or it may be separately made, as illustrated in FIG. 5, and attached to the cylinder by threads or the like. Lead wire 36 connects attractor ring 29 to potential source 53 and lead wire 38 connects corona needle 27 to ammeter 54.

In FIGS. 6 and 7 is shown an alternative technique for making injector cylinder 19 which may be used in the FIG. 2 embodiment, for example. In this embodiment cylinder 39 is made of Teflon and the nozzle 41 is formed from the Teflon cylinder itself. In certain situations it may be desirable to offset the opening 43, as shown, so that more threads will be available to hold corona needle 45 and also provide better insulation of the steam from the cooling effect of the fluid. Section 47 of the needle is reduced in size to minimize the cooling of the steam. The attractor ring 29 is positioned flush with the outside surface of cylinder 39.

In FIG. 8 is illustrated the details of needle collector 17 used in the FIG. 1 and the FIG. 2 embodiments. Needle collector 17 includes body 49, needle 51, and lead wire 52. The body 49 surrounds part of needle 51 and wire 52 and is machined from Plexiglass, or similar dielectric material. The exposed length of the needle is not critical, but the overall needle collector 17 should be streamlined with respect to air flow. Electrical signals from needle 51 are transmitted by lead wire 52 to the electrical equipment, shown in FIG. 1.

The operation of the electrogasdynamic spectral anemometer of the present invention is as follows: From an outside source, not shown, steam is introduced in injection cylinder 15. This steam may be saturated at a pressure of about 8psig and a temperature of about 235° F, for example. As the steam issues out of the nozzle it supersaturates and condenses into droplets having varying size depending upon the condition of the incoming steam. The droplets are then charged through the corona, developed between the corona needle 27 and the attractor ring 29. The amount of charge is determined by the level of the potential provided by variable potential source 53 and the size of the water droplets. The choice of droplet size depends upon the desired frequency response of the anemometer. That is, if the turbulent flow has a maximum frequency of about 20,000 hertz, then the droplet size must be very small, for example, about $10^{-7}$ meters. This is because larger particles have too much inertia and would not follow the turbulence. However, if the turbulence is about 3,000 hertz, then the droplets could be about one micron. In FIG. 9 is illustrated curves that bracket the desired droplet sizes which optimally match the highest frequency response of the interest. It should be noted that matching the highest frequency automatically matches all others. Also, it is preferable to match the droplet size with the highest frequency response because small droplets are generally more difficult and expensive to produce than larger droplets. It should also be noted that other materials may be substituted for water. That is, most dielectric liquids may be used. Moreover, it has been found that solid particles may be also used. For example, submicron polystyrene latex spheres are available on the open market and have been found to be satisfactory. Hollow spheres are preferably used because they are lighter and have a frequency response that is higher than solid spheres of the same size.

When the charged particles are injected into the turbulent stream, they follow the rapid fluctuations because of the matching of the particle size to the frequency. These charged particles move with the flow towards the needle collector and when a charged particle passes the needle of the collector it becomes neutralized and transmits a signal into the collector circuitry shown in FIG. 1. Capacitor 55 of this circuitry functions to isolate frequency analyzer 57 from the D.C. component of generated signals. Ammeter 59 functions to measure the D.C. component of generated signals. Diode 61 functions to prevent reversal of current and resistors 63 and 65 provide a voltage divider network for use with an oscilloscope or the like for analyzing the characteristics of the signals. Typically, the frequency analyzer will provide information about the intensity of the turbulence at the various frequency of interest. The intensity is determined by the total count over a predetermined sampling period at a particular frequency. It should be noted that a complete position measurement spectrum may be obtained by moving the needle collector into a plurality of different positions.

What is claimed is:

1. A device for measuring the dynamic characteristics of a fluid comprising:
   a. an injector for injecting particles into said fluid;
   b. a collector for collecting particles injected into said fluid;
   c. a source of particle material operatively connected to said injector;
   d. said injector including charging means for electrically charging said particles; and
   e. means for measuring the charge and frequency of the particles collected by said collector.

2. The device of claim 1 wherein:
   a. said particles have a size range from about $10^{-6}$ meters to about $10^{-8}$ meters in radius.

3. The device of claim 2 wherein:
   a. said particles having a linearly decreasing size range of from about $10^{-5}$ to about $10^{-9}$ meters in radius with a linearly increasing turbulent frequency of said fluid of from about 1 to about $10^{10}$ hertz per second.

4. The device of claim 3 wherein:
   a. said source of particle material is steam near the saturation point.

5. The device of claim 1 wherein:
   a. said injector includes a wall forming a cavity;
   b. a first opening in said wall for introducing said particle material into said cavity;
   c. a second opening in said wall for introducing particles into said fluid;
   d. a corona needle positioned within said cavity and spaced from said second opening; and e. an attractor ring surrounding and forming part of said second opening.

6. The device of claim 5 wherein:
a. said second opening is formed by a nozzle operatively connected to said wall and extending outwardly from the outside surface of said wall.

7. The device of claim 6 wherein:
a. said collector is operatively connected to one side of a capacitor; and
b. the other side of said capacitor is operatively connected to a device for measuring the number of particles contacting said collector at a predeterined frequency.

8. The device of claim 5 wherein:
a. said second opening is formed by a nozzle formed in said wall; and
b. said attractor being positioned flush with the outside surface of said wall.

* * * * *